INVENTORS
Curt Cüppers &
Kurt Kirchhübel

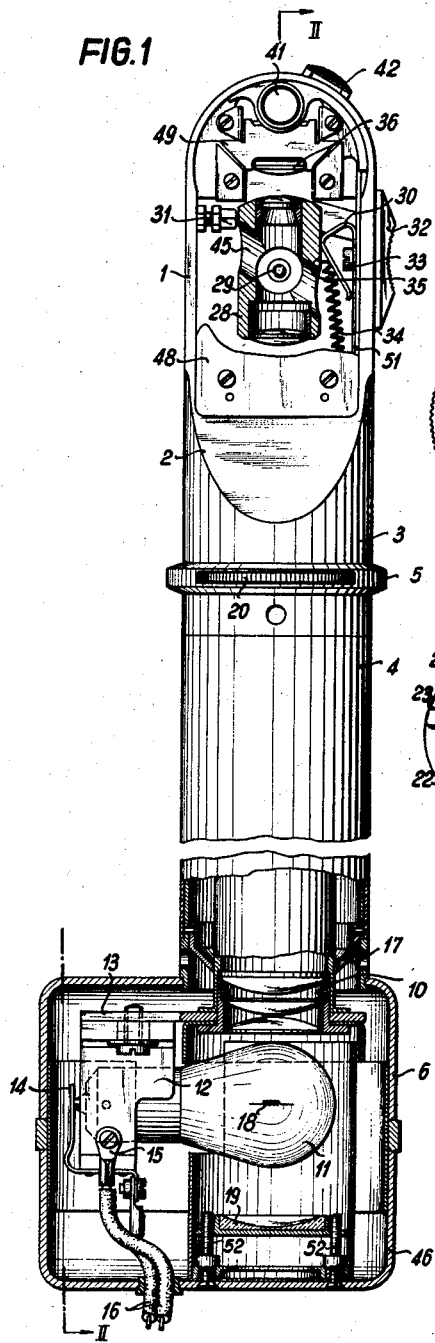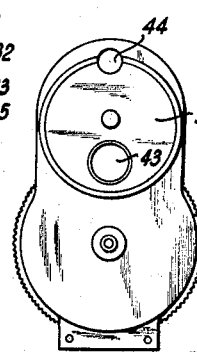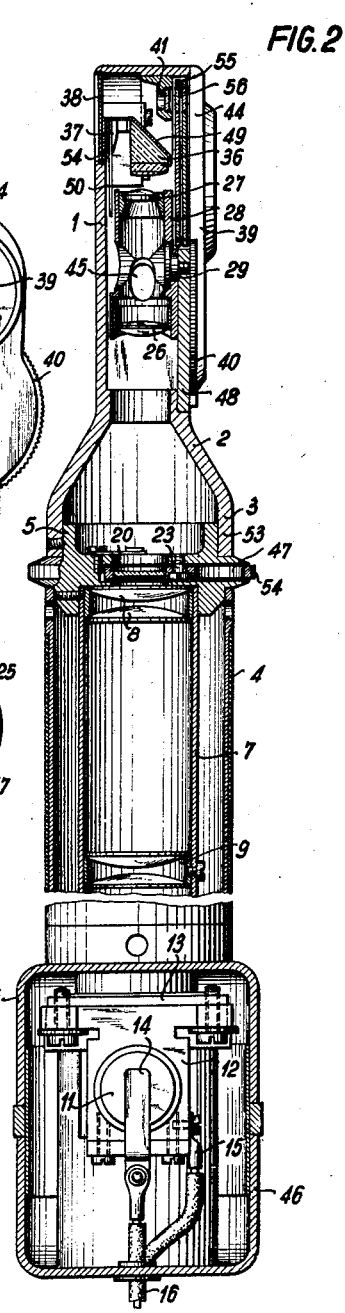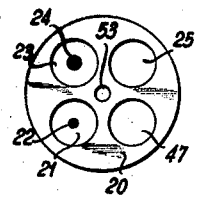
INVENTORS
CURT CUPPERS and
KURT KIRCHHUBEL

_Patented Sept. 8, 1959_

2,902,899

OPHTHALMOLOGICAL HAND INSTRUMENT FOR THE EXAMINATION OF THE RETINA OF THE EYE

Curt Cüppers, Giessen, and Kurt Kirchhübel, Dutenhofen, Germany, assignors to "Oculus" Optikgeräte G.m.b.H., Dutenhofen, Germany, a firm Application August 25, 1955, Serial No. 530,596

Claims priority, application Germany August 31, 1954

1 Claim. (Cl. 88—20)

The invention relates to ophthalmological hand instruments, i.e., instruments which during the examination by an oculist are held in close proximity to the eye being examined.

These instruments possess on the one hand a lens system for the light serving to illuminate the retina of the eye and on the other hand an adjustable lens system for the observation of the retina of the eye by the oculist carrying out the examination. The lens system first referred to is so arranged that the light, proceeding from an electric lamp brightly illuminates a small portion of the retina of the eye. The vertical angle of the cone of light entering the eye amounts to only a few degrees. This dimensioning of the cone of light is possible, because examination of the retina of the eye takes place practically point by point, and heretofore has been considered necessary, as only a small cone of light permits the possibility of not subjecting the center of vision, i.e., the fovea or macula, longer than is absolutely necessary to the effect of dazzle produced by the beam of light. In known apparatus vertical angles of more than a few degrees in respect of the emitted cone of light are moreover incapable of being employed if only for the reason that the light intensity of the ordinary electric lamp provided in the handle of the instrument is too small to illuminate to a sufficient extent an area of larger size at the retina of the eye. Accordingly, in known apparatus the vertical angle of the cone of light is below 10 degrees, and it exceeds this value by a very few degrees only in exceptional cases.

In contradistinction to known instruments the ophthalmological hand instrument according to the invention is so designed that the vertical angle of the emerging cone of light amounts to 20 degrees or more, and preferably to 30 degrees, and that a source of light of such intensity is arranged in the apparatus that the large portion of the retina of the eye located within the cone of light is illuminated in full. An instrument of this nature provides considerable advantages for various purposes, particularly in those cases in which there is also provided in the apparatus a filter element comprising a translucent section of glass having an opaque area provided at the center thereof, preferably in the form of a spot, i.e., a filter which, upon illumination of the retina of the eye, enables the macula to be precluded from the illumination.

An instrument according to the invention permits, for example, the examination as to whether strabismic eyes are still capable of fixing themselves on an object with their correct center of vision, i.e., with the macula. It is well known that strabismic eyes develop during the course of time a false center of vision, which corresponds to the macula of the non-strabismic eye, while the macula of the strabismic eye loses its power of vision. If this eye has already lost its functional power to a large extent a rectification of the strabismic eye to accord with the other eye by way of an operation does not produce any alteration in the line of vision of the strabismic eye, but merely a variation in the position of the eye, as the strabismic eye is no longer capable of utilising the macula for purposes of vision. In the majority of cases it then again adapts itself in the course of time to the center of vision acquired, i.e., the eye again becomes strabismic.

Owing to the large vertical angle of the emerging cone of light and the great intensity of the lamp, and upon adjustment of the instrument to the retina of the eye in such a way that the correct center of vision, i.e., the macula, is located in the shadow of the opaque spot of the filter, it is possible with an instrument according to the invention to dazzle a large portion of the retina of the eye so strongly that the part surrounding the macula, and accordingly any false center of vision, is precluded. Since by reason of the shadow effect of the filter the macula itself is not affected, the eye, following the dazzle effect, is able to see only by means of the macula, in so far as it is still capable of vision at all. For the duration of the dazzle effect the possibility then exists, to carry out tests, and to examine and, if still possible, to excite the visionary powers of the eye, to thereby again establish the correct line of vision.

Owing to its high light intensity, the coverage of a large portion of the retina of the eye and protection of the macula against dazzle, the instrument also offers advantages as regards other examinations of the retina of the eye, particularly in the case of cornea or lens overclouding.

In order to carry out preliminary examinations, for example in finding the macula, not to dazzle the eye unnecessarily, an iris diaphragm is arranged about the beam of light of the instrument, so that the extent of the illuminated area can at times be reduced.

To enable the instrument also to be employed as a normal but particularly bright ophthalmoscope, a part of the projecting optical system is arranged to be pivoted.

When employing a lamp of high output, i.e., a lamp of high wattage, as is necessary in accordance with the invention, there occurs with the usual arrangement of the lamp within the handle an undesirable heating of the handle, which is usually of tubular form. To avoid this the lamp is mounted in a special casing at the end of the tubular member, and a loss of light, despite the resulting large distance of the lamp from the field lenses, is avoided by the inclusion of a condenser system comprising a plurality of lens systems.

Furthermore, in order to be able to make use of cheap lamps of the ordinary commercial kind in place of special lamps, there are employed for the purpose illumination lamps, the filament of which is arranged approximately in the axis of the mounting, viz., in such position that the axis of the lamp mounting is disposed perpendicularly to the optical axis of the condenser system. This has the advantage that the rays passing through the optically correct parts of the glass envelope of the lamp are capable of being employed, and that behind the lamp a concave mirror may be provided, which practically doubles the utilisation of the light, so that lamps may be employed having a smaller wattage than would otherwise be necessary.

In order that the invention may be more clearly understood, a preferred embodiment thereof will now be described by way of example with reference to the accompanying drawing, in which Fig. 1 is a side elevation, partly in section of the apparatus directed towards the observer;

Fig. 2 is a vertical section taken on the line II—II in Fig. 1 in the direction of the arrows;

Fig. 3 is a side view of the Rocoss lens plate of Fig. 1;

Fig. 4 is a front view of the filter element of the instrument on an enlarged scale.

Figure 5:
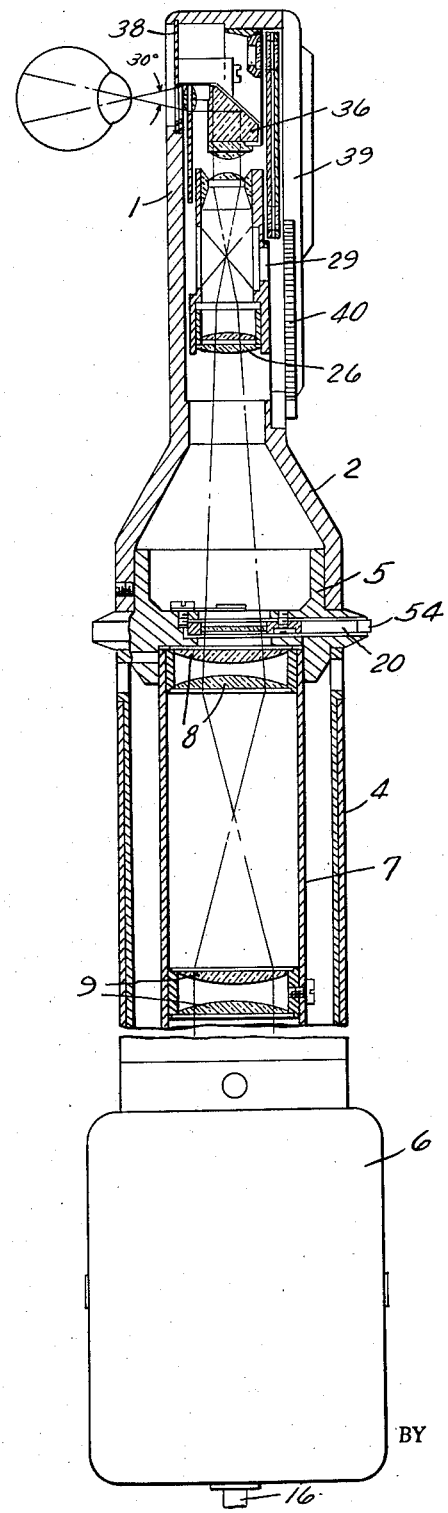
Fig. 5 is a vertical section similar to Fig. 2 to illustrate the cone of light as it is projected from the instrument into the eye.

The casing of the instrument comprises a portion 1 of rectangular cross-section having a conical part 2 merging into a cylindrical portion 3, a tubular member 4 serving as a handle, which is secured to a ring 5 located in the portion 3, and a box-like portion 6, which is secured to the lower end of the tubular member 4 and is closed by means of a cap 46.

In the ring 5 there is secured a tubular element 7 carrying three lens systems 8, 9 and 10. The lens systems form together a condenser system and have the object of transmitting the light emitted by the electric lamp 11 of the instrument without loss of intensity over the length of the tubular member 4 and of passing it to the field lenses located in the head portion 1. The lamp 11 is not arranged in the usual manner below the lens system 8 in the tubular member 4 itself, but below the tubular member, as a lamp of the requisite high wattage would heat the tubular member 4 acting as handle of the instrument to such an extent that it could no longer be held in the hand.

As shown in Fig. 1, the mounting 12 for the lamp 11 is secured to a support 13, which in turn is carried by the lower end of the tubular element 7, which is centered in the tubular member 4 by a ring 17. Connected to the contacts 14 and 15 on the lamp mounting are the wires 16 leading to the source of current. The lamp employed is an ordinary commercial incandescent bulb having a filament 18, which is located in the axis of the lamp mounting, and in the position of the lamp 11, Figs. 1 and 2, is disposed perpendicularly to the axis of the condenser system 10. In this way use is made of the optically clear portion of the glass bulb, and not of the part rendered opaque by the sealing of the bulb, i.e., by the fusing point. It is thus possible to make use of ordinary lamps in place of special lamps.

To permit maximum utilisation of the amount of light obtained from the lamp there is secured in adjustable manner on screws 52 to the bottom of the casing 6, a concave mirror 19, which transmits the light reflected thereby to the condenser system 10. The intensity of the light is thus practically doubled. The focal point of the mirror is selected in such a way that it is situated just in front of or behind the filament 18, in order to avoid damage to the filament.

In the ring 5 there is mounted to be capable of rotation about the pin 53, a disc 20, which is illustrated in Fig. 4. This disc has four mountings, one of which receives a translucent plate 21 having a black dot 22, while the second accommodates a similar plate 23 having a larger black dot 24, and the third a green filter 25, the fourth mounting 47 being empty. Upon interposition of the plate 21 or 23 a dark field will accordingly be produced in the center of the pencil of light emerging from the condenser 8. This disc 20 projects with its edge 54 out of the ring 5 and in this way may be adjusted by rotation.

The cone of light emerging from the lens system 8, after passing through one of the filters or through the open aperture 47, is directed to the field lens 26, which is a biconvex lens, and after reversal by means of this lens to the following field lens 27, which is a plano-convex lens. Both lenses 26 and 27 are located with their mountings in a tubular member 28, which is capable of being rocked by approximately 40 degrees about a stud 29. This stud is located in a plate 48, which is secured in the casing portion 1, the latter being open towards one side. In the position shown in the drawing the tubular member 28 is pressed by means of a leaf spring 30 against an adjustable stop 31. The leaf spring is secured to a slide member 32 on the outside of the casing 1 by means of a screw 33. If the slide member is moved downwards, a spring 34, which is secured to the casing 1 and at 35 to the tubular member 28, rotates the latter clockwise about the stud 29. In the wall of the tubular member 28 there are provided at an angle to the axis, openings 45 through which, after rocking of the tubular member 28, the cone of light is able to pass, so that the lens system comprising the field lenses 26 and 27 can be precluded.

In the position of the tubular member 28 shown in the drawing the light is transmitted from the field lens 27 to the prism 36, which is secured to a sheet metal member 49 in the casing portion 1. By means of this prism the light is deflected by 90 degrees and is conducted to the plano-convex lens 37, which is located in front of the aperture 38 in the casing portion 1 and is secured to a support 50. The light is then projected through the aperture 38 outwards. The lens 37 has a focal distance which is so short that the cone of light emitted possesses a vertical angle of at least 20 degrees, preferably 30 degrees. In this way, at a short distance away from the eye, a very large portion of the retina of the eye can be illuminated owing to the use of a lamp of high wattage, of the concave mirror 19, and of the condenser system 8—10 with very great intensity of light.

The support 50 has the form of a rectangular piece of sheet metal, and the bent portion 51 thereof is secured by means of the screw 33 to the slide member 32, i.e., upon downward movement of the slide member the lens 37 is also moved downwards, so that the light is able to pass out freely through the aperture 38. The latter is covered by a flat piece of glass 54, or, if desired, by a plano-convex lens.

Onto the open side of the casing portion 1 directed towards the observer there is screwed a threaded casing portion 39 provided with an adjustable lens system comprising two lens plates 55, 56 of known construction (Rocoss plates). These lens plates are adjustable by means of a Geneva gear, the operating element of which is shown at 40. The observation aperture, which is closed by a plano-convex lens and in front of which the individual lenses of the lens plates are brought into alignment is situated above the prism 36 in front of the upper part of the aperture 38. Between the two there is located in the line of observation a filter 41, which may be rocked into the line of observation by a slide 42, for example a filter for polarising the light for the purpose of eliminating light reflexes. An aperture for reading the dioptric values of the adjusted lenses of the lens plate is shown at 43.

The field lenses in the path of the light from the lamp 11 are not adjustable, i.e., the black dots 22, 24 cannot be reproduced sharply on the retina of the eye if the eye is shortsighted or farsighted. Should this be desired a Rocoss plate having roughly graduated lenses can likewise be provided in the instrument on the side directed towards the patient, so that a reproduction of the shadow portions is possible even if the fault in the vision is very considerable.

What we claim as new and desire to secure by Letters Patent of the United States is:

An ophthalmological hand instrument for the examination of the retina of the eye, comprising an elongated casing, an electric source of light arranged in one end of said casing, a lens system adapted to collect the light rays of said source of light into a beam of light rays for transmission along a path of light which is in the form of a cone of light arranged within said casing spaced from said source of light, a reflecting sheet metal member having a deflecting prism secured thereto and adapted to deflect the cone of light by approximately 90° arranged in the path of light from said lens system, a plano-convex lens arranged within the casing before the lower portion of an opening provided in the wall of said casing in front of said deflecting prism so that the cone of light deflected by said deflecting prism is projected therethrough to the outside and onto the retina of the eye, said plano-convex lens having a short focal distance so that the cone of light emitted therethrough has an angle of at least 25°, an adjustable lens system for the examination of the retina of the eye by the oculist arranged in said casing in such position that the examination is effected by the oculist over and across the upper edge of said deflecting prism and through the upper portion of said opening provided in the wall of the casing, and a translucent plate provided with an opaque dark center section for rotation into the path of light arranged between said source of light and said lens system in such position that in said beam of rays and also on the retina of the eye a dark field is produced sufficient to preclude the macula of the eye from illumination.

References Cited in the file of this patent

UNITED STATES PATENTS

| | | |
|---|---|---|
| 1,236,722 | Lange | Aug. 14, 1917 |
| 1,774,832 | Keeler | Sept. 2, 1930 |
| 1,889,456 | Tillyer | Nov. 29, 1932 |
| 1,943,509 | Bauersfeld | Jan. 16, 1934 |

FOREIGN PATENTS

| | | |
|---|---|---|
| 333,925 | Great Britain | Aug. 25, 1930 |
| 511,555 | Great Britain | Aug. 21, 1939 |
| 676,843 | Great Britain | Aug. 6, 1952 |
| 624,095 | Germany | Jan. 13, 1936 |
| 840,169 | Germany | May 29, 1952 |

OTHER REFERENCES

The Optician, Berte (British) article, vol. CXXII, No. 3151, August 24, 1951, pp. 125, 126.